United States Patent [19]
Nomura et al.

[11] Patent Number: 5,936,782
[45] Date of Patent: Aug. 10, 1999

[54] OBJECTIVE LENS FOR A PICKUP OPTICAL SYSTEM

[75] Inventors: Yoshimitsu Nomura; Masaaki Fukuda; Takashi Ito; Kaneyoshi Yagi, all of Saitama, Japan

[73] Assignee: Fuji Photo Optical Co., Ltd., Saitama, Japan

[21] Appl. No.: 09/032,785

[22] Filed: Mar. 2, 1998

[30] Foreign Application Priority Data

Mar. 27, 1997 [JP] Japan .................................. 9-075710

[51] Int. Cl.⁶ ................................ G02B 3/02; G02B 3/08
[52] U.S. Cl. ........................ 359/719; 359/742; 359/743
[58] Field of Search ................................ 359/719, 742, 359/743

[56] References Cited

U.S. PATENT DOCUMENTS

| | | | |
|---|---|---|---|
| 4,514,052 | 4/1985 | Yamaguchi | 359/765 |
| 4,733,943 | 3/1988 | Suzuki et al. | 359/565 |
| 4,737,447 | 4/1988 | Suzuki et al. | 430/321 |
| 5,777,971 | 7/1998 | Choi | 369/112 |

*Primary Examiner*—Georgia Epps
*Assistant Examiner*—Suzanne Letendre
*Attorney, Agent, or Firm*—Leydig, Voit & Mayer, Ltd.

[57] ABSTRACT

An objective lens for a pickup optical system for optically reading out information recorded in a recording medium, includes a first lens body and a second lens body integrally attached to a surface of the first lens body and having a micro Fresnel portion for focusing light to a predetermined position of the recording medium. When the objective lens is used for a pickup optical system, the micro Fresnel portion faces away from an accommodation region for accommodating the recording medium to prevent dust from attaching to the micro Fresnel portion.

11 Claims, 2 Drawing Sheets

OBJECTIVE LENS FOR A PICKUP OPTICAL SYSTEM

BACKGROUND OF THE INVENTION

1. Field of the Invention

The present invention relates to an objective lens for a pickup optical system for optically reading information recorded on a recording medium such as a compact disk (CD) or a digital video disk (DVD).

2. Related Background Art

As a recording medium, a disk-like compact disk (CD) or a digital video disk (DVD) having the same diameter as that of a CD is known. A CD or DVD is formed by laminating a pair of transparent disks whose thicknesses are equal, and a recording surface on which information is recorded is arranged between the disks. A CD and DVD have different thicknesses. For this reason, even when a DVD is set in a CD player, information recorded on a DVD cannot be read because the position of the recording surface is different from that of the CD.

Under these circumstances, a player capable of reading information from both a CD and DVD has been developed. Such a player normally has an accommodation region for accommodating the recording medium such as a CD and DVD, and a read unit which moves along the radial direction of the CD or DVD is arranged at a position opposing the accommodation region. The read unit incorporates a pickup optical system. Light from a light source is focused on the recording surface of the CD or DVD through the objective lens of the pickup optical system.

Such an objective lens is used for a so-called twin-lens pickup optical system. This pickup optical system has two objective lenses with different focal lengths. Light is focused on the recording surface of the CD or DVD by switching these objective lenses for the CD or DVD.

SUMMARY OF THE INVENTION

The present inventors have examined the above-described twin-lens pickup optical system and found the following problems. Since the twin-lens pickup optical system uses two objective lenses, the number of components increases, so extra space is required. Simultaneously, the read unit must have a device having a complex mechanism for aligning the optical axis every time the objective lens is switched.

It is an object of the present invention to provide an objective lens for a pickup optical system capable of reducing the space occupied by the pickup optical system and allowing the read unit to have a simple structure.

The present invention provides an objective lens for a pickup optical system for optically reading information recorded on a recording medium, comprising a first lens body to be arranged opposite an accommodation region for accommodating the recording medium, and a second lens body integrally attached to a surface of the first lens body on an opposite side of the first lens body from the accommodation region and having a micro Fresnel portion for focusing incident light to a predetermined position of the recording medium.

According to the present invention, the micro Fresnel portion of the second lens body focuses light to a predetermined position of the recording medium accommodated in the accommodation region. In addition, since the second lens body is arranged on the opposite side of the first lens body from the accommodation region where dust can be present with respect to the first lens body, dust hardly attaches to the second lens body.

Also, the present invention provides an objective lens wherein the first lens body is preferably made of a glass material, and the second lens body is preferably made of a plastic material. In this case, since the first lens body is made of the glass material, the surface of the first lens body is hardly scratched even when wiping dust as compared to a plastic material. In addition, since the second lens body is made of the plastic material, the mold used to manufacture the second lens body is rarely damaged as compared to the glass material because of the low viscosity of the plastic material. Furthermore, since the objective lens of the present invention has a composite structure of the glass and plastic materials, the influence of a change in optical constant of the second lens body made of the plastic material due to temperature can be minimized.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENT

A preferred embodiment of an objective lens for a pickup optical system according to the present invention will be described below with reference to FIGS. 1 and 2.

Figure 1:
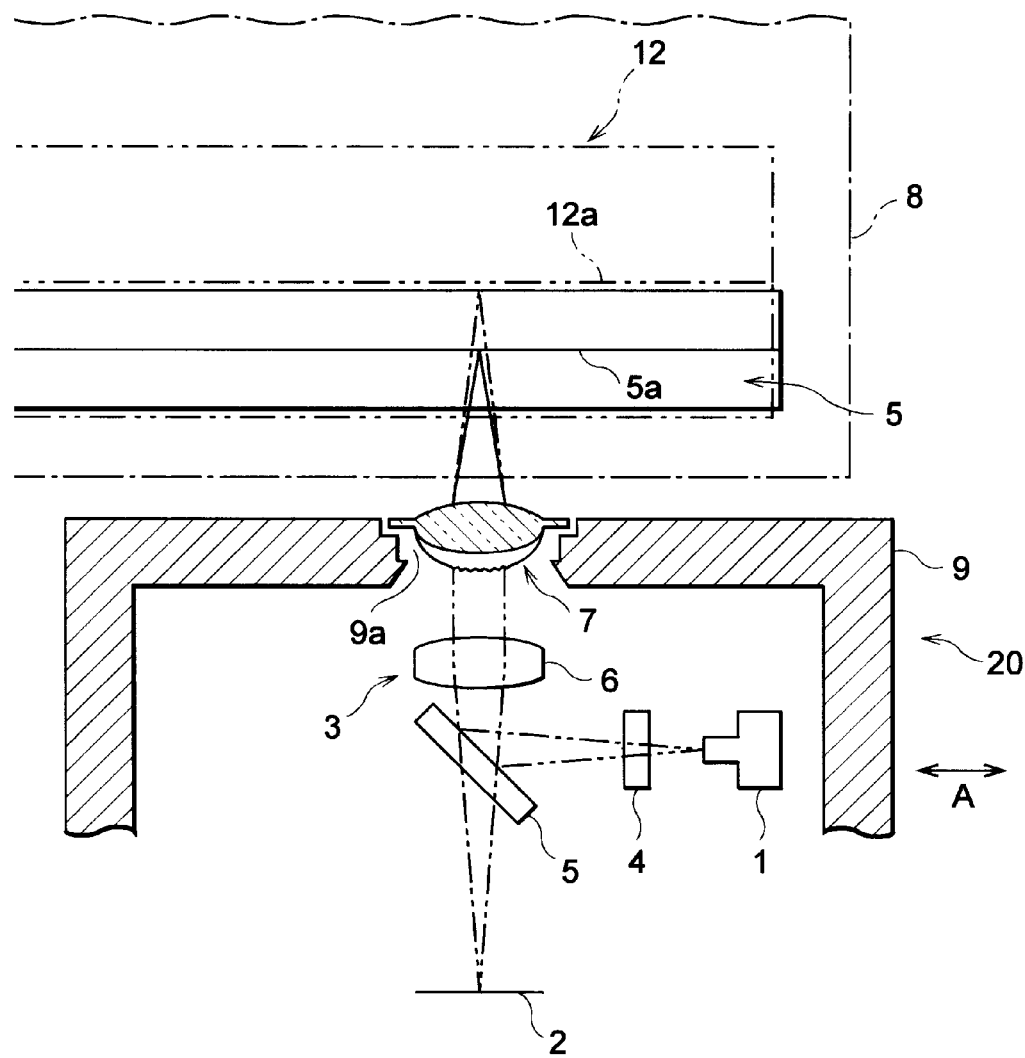
FIG. 1 is a sectional view showing a read unit to which an objective lens for a pickup optical system according to the present invention is applied.

FIG. 1 is a sectional view showing a read unit which is arranged in an information reading apparatus for optically reading information from a CD or DVD and moves along the radial direction of the CD or DVD.

As shown in FIG. 1, a read unit 20 is used to optically read information from a CD 12 or DVD 5 and has a light source (e.g., a laser diode) 1, a photodetector 2, and a pickup optical system 3. The pickup optical system 3 has a diffraction grating 4 arranged on an exit side of light from the light source 1, a half mirror 5 for reflecting the light passing through the diffraction grating 4, a collimator lens 6 for collimating the light reflected by the half mirror 5 into a parallel beam, and an objective lens 7 for focusing the light from the collimator lens 6 to a recording surface 12a or 5a of the CD 12 or DVD 5. The half mirror 5 passes the light reflected by the recording surface 12a or 5a and passing through the objective lens 7 and the collimator lens 6 and guides the light to the photodetector 2.

The read unit 20 has a holding case 9 having light-shielding properties. The light source 1, the photodetector 2, the diffraction grating 4, the half mirror 5, and the collimator lens 6 are accommodated in the holding case 9. The holding case 9 has an opening portion 9a. A peripheral portion 17 of the objective lens 7 is fixed to an opening edge portion 16 on a surface 15 of the holding case 9, which is defined by the opening portion 9a. The objective lens 7 opposes an accommodation region 8 for accommodating the CD 12 or DVD 5. The read unit 20 can be reciprocally moved by a driving unit (not shown) along the radial direction of the CD 12 or DVD 5 (in a direction indicated by an arrow A in FIG. 1).

Figure 2:
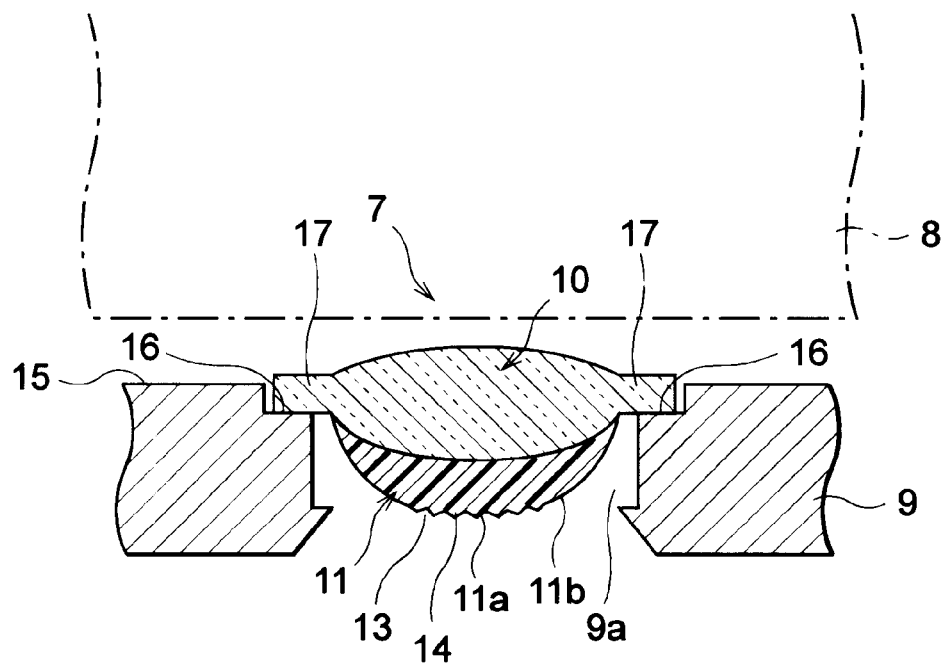
FIG. 2 is an enlarged sectional view showing the objective lens shown in FIG. 1.

As shown in FIG. 2, the objective lens 7 has a first lens body 10 with a first side opposing the accommodation region 8. A second lens body 11 is integrally attached to the first lens body 10 along a second, opposite side of the first lens body 10 facing away from the accommodation region 8. The second lens body 11 has a micro Fresnel port 11a on its surface and a peripheral portion 11b at its periphery. The micro Fresnel portion 11a having a plurality of grooves 13 or projections 14 which are concentrically formed at equal intervals has the function of a diffraction grating and appropriately focuses light incident on the micro Fresnel portion 11a of the objective lens 7 to different positions along the optical axis. For example, the micro Fresnel portion 11a focuses the incident light on the recording surface 12a of the CD 12 or the recording surface 5a of the DVD 5.

The objective lens 7 is an aspherical lens. Therefore, aberration generated in the objective lens 7 becomes small, so the diffraction light from the objective lens 7 is focused to one point on the recording surface 5a of the DVD 5 or the recording surface 12a of the CD 12.

According to the objective lens 7 with the above-described structure, light incident on the micro Fresnel portion 11a of the second lens body 11 is diffracted on the accommodation region 8 side in a direction indicated by the two-dot chain line or solid line in FIG. 1 and focused on the recording surface 12a of the CD 12 or the recording surface 5a of the DVD 5. With this arrangement, since the read unit 20 is constituted by using one lens without using two lenses having different focal lengths, the space occupied by the pickup optical system 3 in the read unit 20 can be reduced.

In addition, since the objective lens 7 is held by the holding case 9 and has the second lens body 11 facing in an opposite direction from the accommodation region 8, dust in the accommodation region 8 is properly prevented from attaching to the micro Fresnel portion 11a of the second lens body 11, so the dust need not be wiped.

In the objective lens 7, preferably, the first lens body 10 is made of a glass material, and the second lens body 11 is made of plastic material. As the glass material, a conventionally known glass material for a lens, e.g., P-BK40 is used. As the plastic material, e.g., an ultraviolet curable resin is used. As the ultraviolet curable resin, e.g., MP-201 (product name, Mitsubishi Rayon Co., Ltd) is used. In this case, the first lens body 10 opposes the accommodation region 8, and dust tends to attach to the first lens body 10. However, since the first lens body 10 is made of a glass material, the first lens body 10 is hardly scratched even when wiping dust as compared to a plastic material. In addition, since the second lens body 11 is made of a plastic material, the mold used to manufacture the objective lens 7 is rarely damaged, resulting an improvement in production efficiency. Furthermore, since the objective lens 7 has the composite structure of the glass and plastic materials, the influence of a change in optical constant of the second lens body 11 made of the plastic material due to temperature can be minimized.

The objective lens 7 can be manufactured in the following manner. The first lens body 10 which has already been molded from the glass material is pressed into a mold (not shown) having a concave surface complementary to the surface of the second lens body 11, which corresponds to the micro Fresnel portion 11a, through the plastic material, i.e., the ultraviolet curable resin, and then, an ultraviolet ray is irradiated on the plastic material from the first lens body 10 side.

The present invention is not limited to the above-described embodiment. For example, as far as the objective lens 7 is used for a pickup optical system, the object from which information is to be read out is not limited to the CD 12 or DVD 5, and another equivalent recording medium may be used.

The second lens body 11 has, on its surface, the micro Fresnal portion 11a and the peripheral portion 11b. However, the peripheral portion 11b may also be formed as a micro Fresnel portion such that the entire surface of the second lens body 11 has the micro Fresnel portion 11a on its entire surface.

In the objective lens 7, the first lens body 10 is made of a glass material, and the second lens body 11 is made of a plastic material. However, the lens materials are not limited to these materials and may be appropriately changed, as needed.

As has been described above, according to the objective lens of the first lens body from the present invention, the second lens body is arranged on the opposite side of the accommodation region. With this arrangement, information from different recording media can be read by one lens, and in the read unit, the space occupied by the pickup optical system can be reduced. In addition, dust or the like in the accommodation region is prevented from attaching to the micro Fresnel portion of the second lens body.

The first lens body is made of a glass material, and the second lens body is made of a plastic material. Therefore even when wiping dust attaching to the first lens body, the first lens body is hardly scratched as compared to the plastic material. Furthermore, since the objective lens has a composite structure of the plastic and glass materials, the influence of a change in optical constant of the second lens body made of the plastic material due to temperature can be minimized.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An objective lens for a pickup optical system for optically reading information recorded on a recording medium, comprising:

a first lens body having first and second opposite sides, the first lens body to be arranged with its first side opposing an accommodation region for accommodating said recording medium; and a second lens body integrally attached to the second side of said first lens body and having a micro Fresnel portion for focusing incident light to a predetermined position of said recording medium.

2. An objective lens according to claim 1, wherein said micro Fresnel portion has a plurality of grooves concentrically formed in a surface of said second lens body at equal intervals.

3. An objective lens according to claim 1, wherein said first lens body is made of a glass material, and said second lens body is made of a plastic material.

4. An objective lens according to claim 3, wherein the plastic material is an ultraviolet curable resin.

5. An objective lens according to claim 4, wherein said lens is an aspherical lens.

6. An objective lens according to claim 1, wherein said first and second sides of said first lens body are convex.

7. An objective lens according to claim 6, wherein said second lens body has a concave side facing said first lens body and a convex side facing away from said first lens body.

8. An objective lens according to claim 1, wherein said lens is mounted in a case with the first side of the first lens body opposing said accommodation region.

9. An objective lens according to claim 1, wherein said lens can focus light at two points along an optical axis of said lens.

10. A pickup optical system comprising:
   an accommodation region for receiving a recording medium;
   a light source; and
   an objective lens focusing light from the light source at said accommodation region and including a first lens body having first and second opposite sides, with said first side opposing said accommodation region, and a second lens body attached to said second side of said first lens body and having a micro Fresnel portion.

11. A pickup optical system according to claim 10, wherein said micro Fresnel portion focuses light from said light source at two points along an optical axis of said lens.

* * * * *